United States Patent [19]

Wait

[11] 4,192,216

[45] Mar. 11, 1980

[54] ONE-MAN ARMORED VEHICLE

[75] Inventor: Henry J. Wait, Nicholasville, Ky.

[73] Assignee: Mason & Hanger-Silas Mason Co., Inc., Lexington, Ky.

[21] Appl. No.: 876,567

[22] Filed: Feb. 10, 1978

[51] Int. Cl.² .......................................... F41H 7/02
[52] U.S. Cl. ................................. 89/40 B; 89/36 L; 180/6.66; 296/146
[58] Field of Search ................ 89/36 H, 36 L, 40 B; 180/6.2, 6.66; 296/146

[56] References Cited

U.S. PATENT DOCUMENTS

| | | | |
|---|---|---|---|
| D. 144,344 | 4/1946 | Alexander | D90/8 |
| D. 228,232 | 8/1973 | Miller | D14/3 R |
| 1,438,878 | 12/1922 | Tomassette . | |
| 1,696,439 | 12/1928 | Knox | 89/40 B |
| 1,747,142 | 2/1930 | Campbell | 89/36 H |
| 2,376,331 | 5/1945 | Abrams | 89/36 H |
| 2,404,256 | 7/1946 | Tapp | 89/36 H |
| 2,432,107 | 12/1947 | Williams | 115/1 |
| 2,722,986 | 11/1955 | Baldine | 180/6.7 |
| 2,822,214 | 2/1958 | Rivolta | 296/146 |
| 3,068,757 | 12/1962 | Even | 89/36 H |
| 3,485,313 | 12/1969 | Rieli et al. | 180/6.2 |
| 3,559,528 | 2/1971 | Cunningham | 89/40 B |
| 3,623,565 | 11/1971 | Ward | 180/6.2 |

FOREIGN PATENT DOCUMENTS 457156 11/1936 United Kingdom ............... 89/40 B

OTHER PUBLICATIONS

Bauer Ordnance Co., "Armored Truck", ORDANCEE, vol. L111 No. 290, Sep.–Oct. 1968, back cover.
"The Secret of the 'Baby'Tank", SCIENTIFIC AMERICAN, vol. CXIX No. 22, Nov. 30, 1918.

Primary Examiner—Stephen C. Bentley
Attorney, Agent, or Firm—Cushman, Darby & Cushman

[57] ABSTRACT

A small, low cost, very maneuverable, self-propelled, one-man armored vehicle makes use of a commercially available chassis and is especially adapted to be used for security purposes. The vehicle is provided with non-steerable wheels, all of which are driven, and controllably so on opposite sides for steering purposes.

9 Claims, 5 Drawing Figures

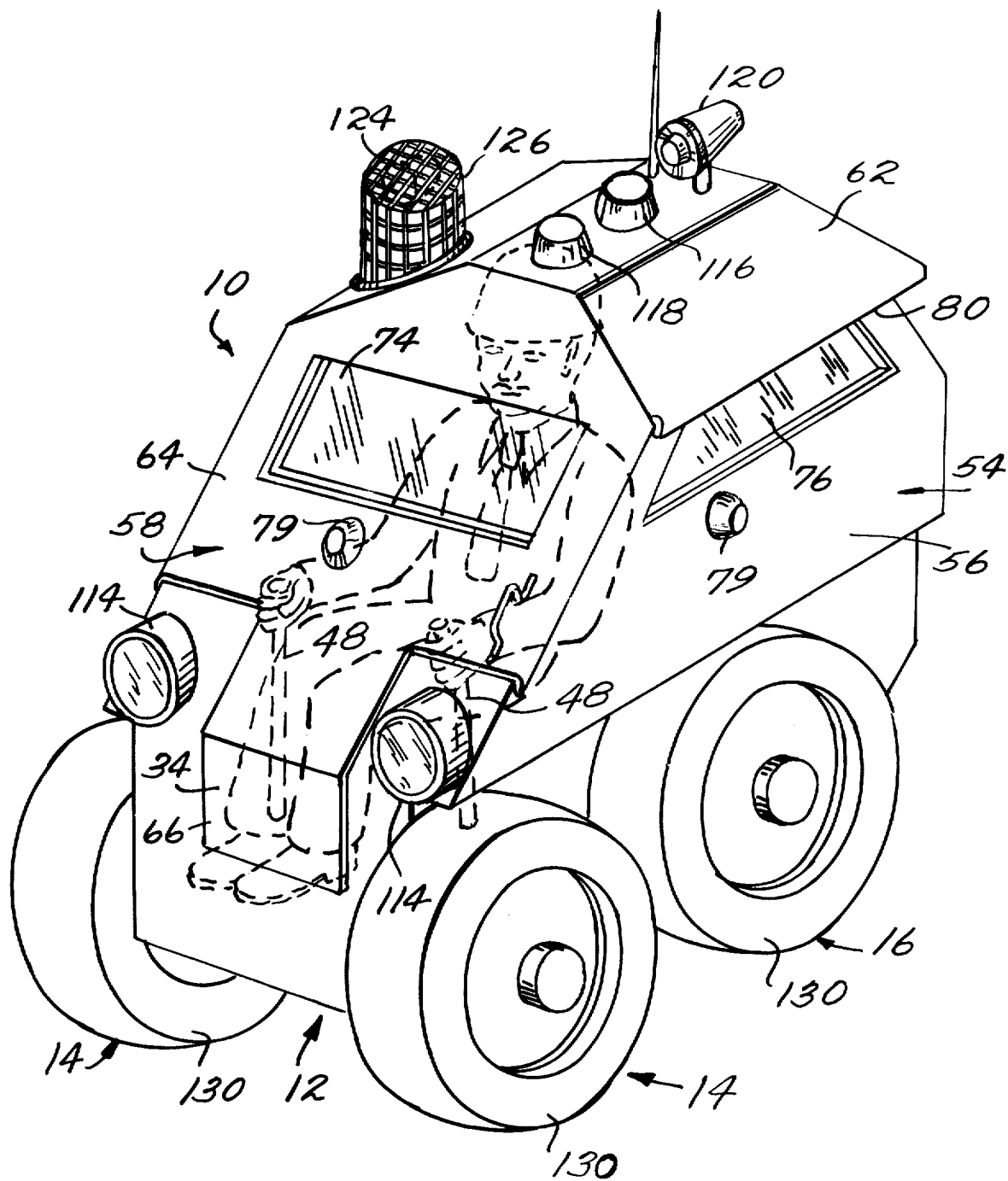

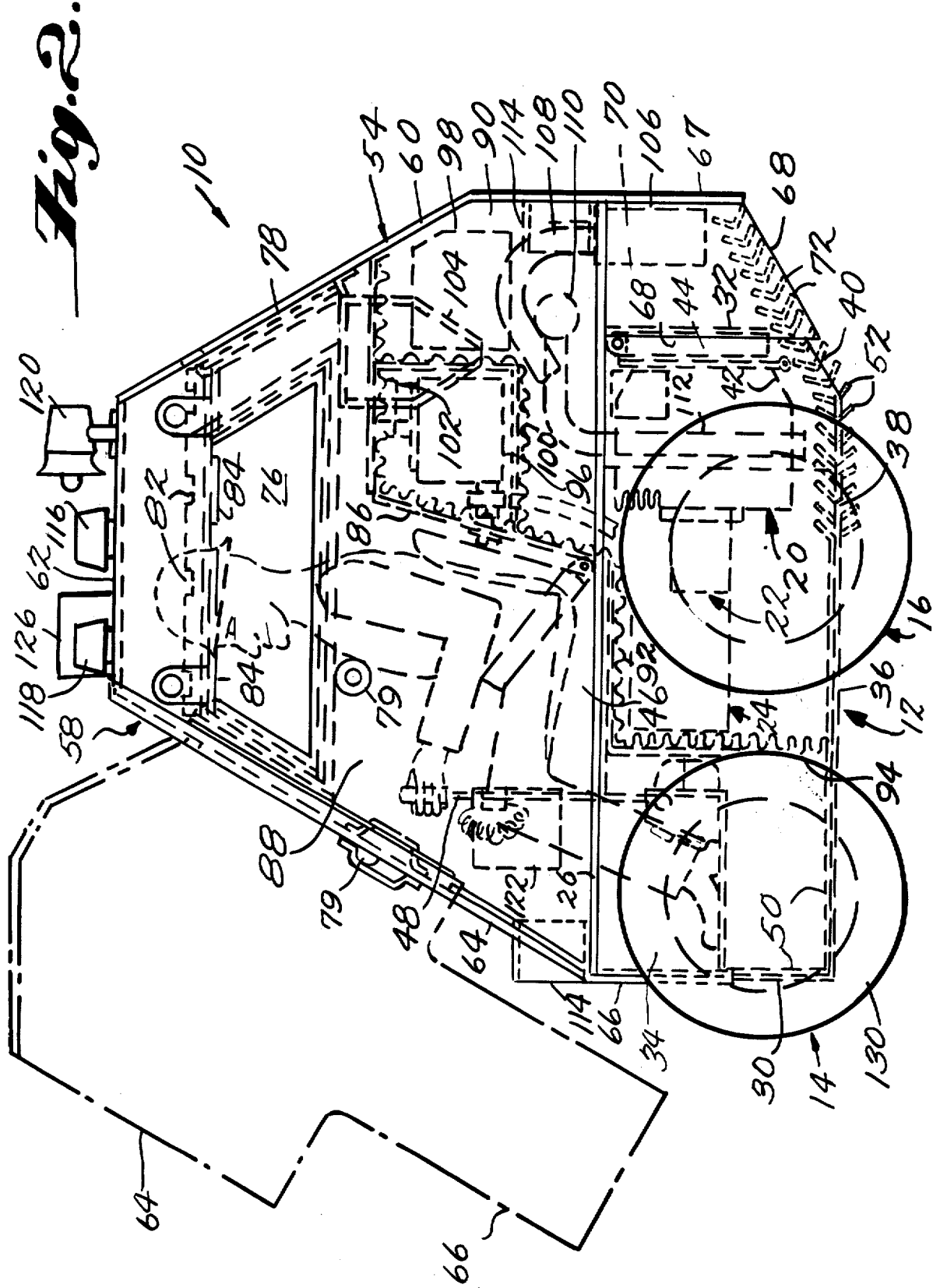

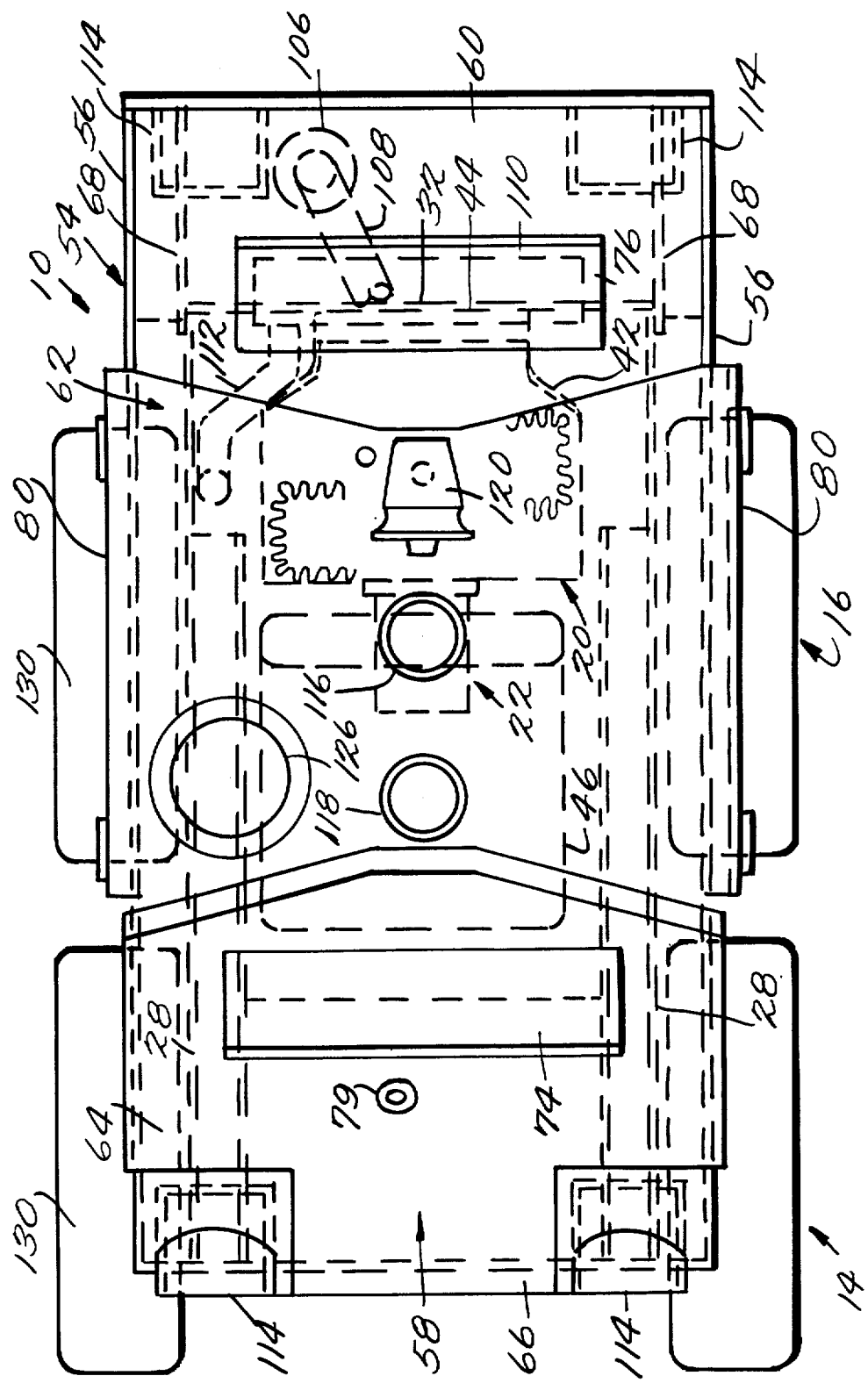

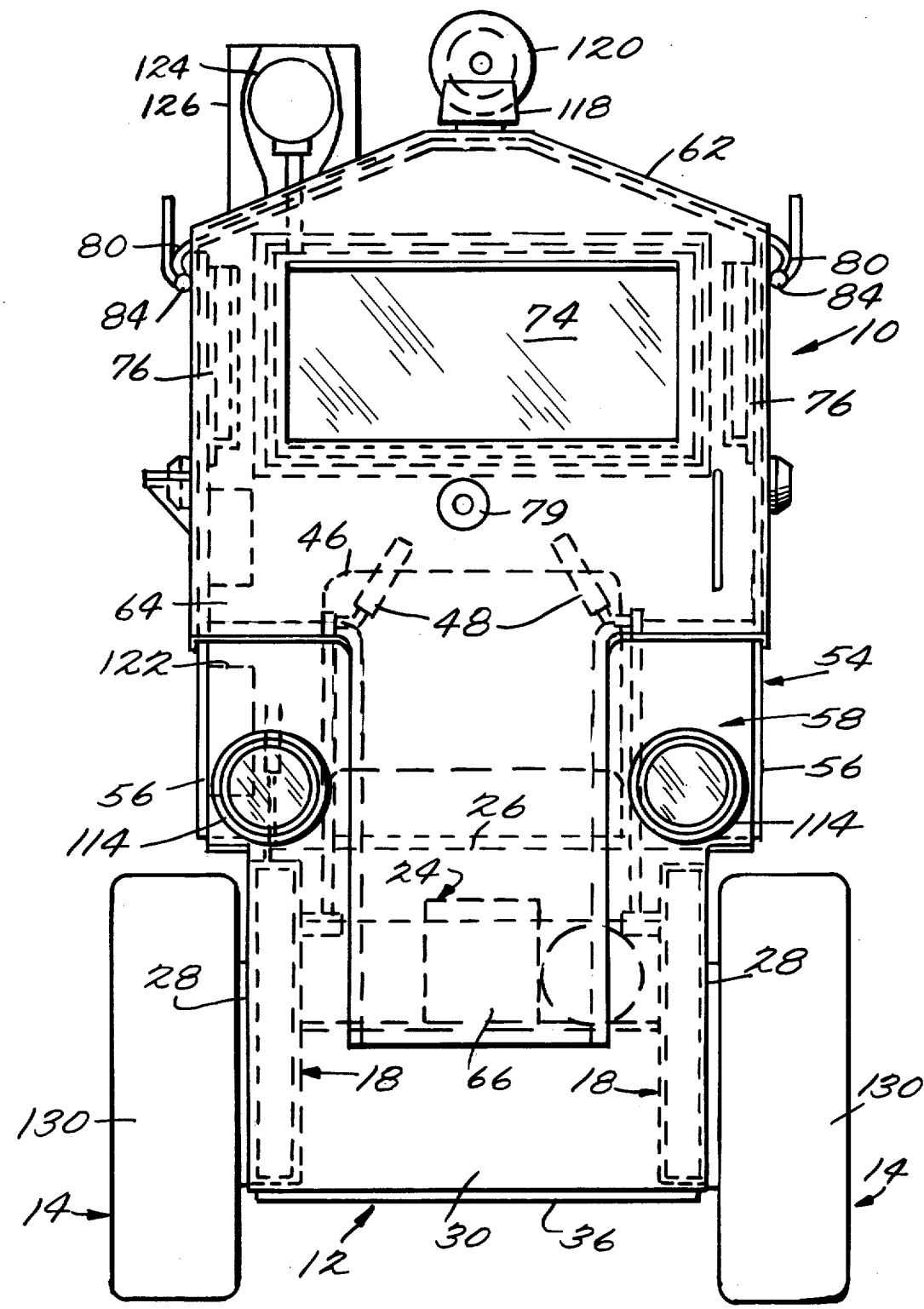

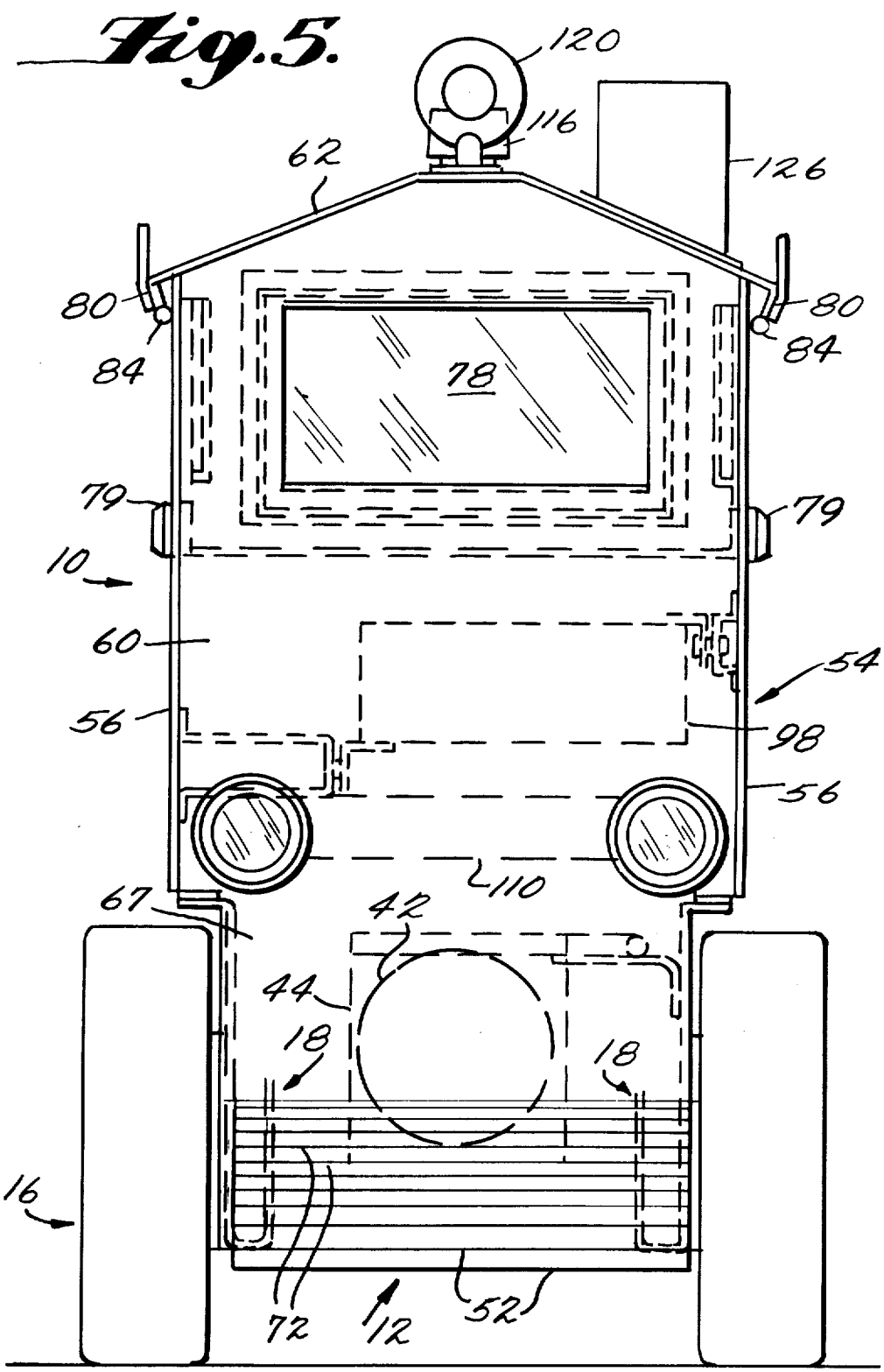

ONE-MAN ARMORED VEHICLE

BACKGROUND OF THE INVENTION

This invention relates to a mini, self-propelled armored vehicle and, more particularly, to a small, one-man, very maneuverable, low cost, armored vehicle expecially adapted to be used for security purposes, such as patrols, alarm responses, protection of critical transactions, hostage situations contention, seige, bomb threat support, etc.

At the present time, unfortunately, a need frequently arises to defend or protect against shows of force, and sometimes terrorist use of force, for theft, sabotage, extortion, political aims, etc. by individuals and small groups. Defensive or protective measures against such acts or threatened acts are included in the term security and involve the guarding of vulnerable critical establishments, such as airports, atomic installations, important industrial facilities, etc., as well as contending with terrorists, hostages, bomb threats, seige and other comparable situations which require the use of armed civil forces.

Many military actions are undertaken on the proven assumption that in order to win, an adversary must be outnumbered two to one, assuming equal capabilities. An object of this invention is to reduce those odds greatly, say one to five, in security situations by protecting individual defenders against weapons usually employed by adversaries, such as pistols, rifles, grenades, home-made bombs, etc., without reducing unduly the offensive capabilities of such defenders. Such reduction in odds would correspondingly reduce the number of defenders required to successfully contend against a given number of adversaries and consequently result in manpower savings.

Small armored vehicles adaptable for such protective purposes are not new as shown, for example, by the following U.S. Pat. Nos.:
Thomasette—1,438,878 filed on Dec. 12, 1922;
Tapp—2,404,256 filed on July 16, 1946;
Williams—2,432,107 filed on Dec. 9, 1947;
Baldine—2,722,986 filed on Nov. 8, 1955;
Alexander—Des. 144.344 filed on Apr. 9, 1946;
Miller—Des. 228,232 filed on Aug. 28, 1973;
The vehicles shown in the above patents, however, involve for the most part complicated expensive or unstable designs, e.g. endless tracks, rotatable gun turrets, floatation devices motorcycle-type arrangements, etc. One exception may be the vehicle shown in U.S. Pat. No. Des. 228,232, but it is impossible to determine the important mechanical and structural attributes thereof. Moreover, it would appear the vehicle shown in that design patent is adapted only for using toxic or semi-toxic gas in offensive or defensive actions. Further, its arrangements for engine air intake and exhaust do not appear to be located for maximum protection or even to be well armored.

BRIEF SUMMARY OF THE INVENTION

Accordingly, the primary object of this invention is accomplished by the provision of a small, low cost, very maneuverable, self-propelled, one-man armored vehicle that makes use of a commercially available chassis and has capabilities of defensive action against relatively lightly armed individuals or groups.

Another object is to provide such a vehicle that is small enough to be capable of negotiating within many buildings, elevators, industrial and airport facilities, etc. where larger conventional armored vehicles cannot penetrate.

Another object is to provide such a vehicle that is wheeled, instead of tracked, with all wheels driven so that it can readily negotiate difficult terrain and with the wheels being non-steerable selectively but controllably driven on opposite sides for steering purposes.

A further object is to provide such a vehicle that is small enough and light enough to be stored and moved in a trailer, truck or van.

It is still another object of this invention to provide such a vehicle that is armored throughout.

Other objects and advantages of the invention will become apparent from the following description and accompanying drawings.

BRIEF DESCRIPTION OF THE DRAWINGS

FIG. 1 is a front perspective view of an armored vehicle embodying this invention.

FIG. 2 is a right elevational view of the vehicle shown in FIG. 1 with parts of interior portions shown in dotted lines.

FIG. 3 is a plan view of the vehicle shown in FIG. 1 with parts of interior portions shown in dotted lines.

FIG. 4 is a front elevational view of the vehicle shown in FIG. 1 with parts of interior portions shown in dotted lines.

FIG. 5 is a rear elevational view of the vehicle shown in FIG. 1 with parts of interior portions shown in dotted lines.

DETAILED DESCRIPTION OF THE INVENTION

Referring now to the drawings there is shown an armored vehicle 10 embodying this invention. The vehicle 10 includes a 4-wheel drive chassis 12 of a commercially available type, the one shown being generally of box-like construction. Although the vehicle 10 illustrated utilizes a 4-wheel drive chassis 12, it is contemplated that use could be made of a commercially available 6-wheel drive chassis, such as that disclosed in U.S. Pat. No. 3,623,565. The front and rear wheels 14 and 16, respectively, of the vehicle 10 are each individually driven by a separate reversible hydraulic motor, indicated diagrammatically at 18 in FIGS. 4 and 5. Housed in the chassis 12 adjacent the rear wheels 16 is a small air-cooled internal combustion engine diagrammatically shown at 20 (FIGS. 2 and 3) directly driving a hydraulic pump 22 which, in turn, supplies hydraulic fluid under pressure to the hydraulic motors 18 through appropriate hydraulic controls, i.e. valving indicated diagrammatically at 24 (FIGS. 2 and 4), located within the chassis adjacent the pump. The floor, side, front and rear walls 26, 28, 30 and 32, respectively of the chassis 12 are of generally plate-like construction. At its front the chassis 12 is provided with an upper central steplike recess 34, for reasons later evident. The bottom 36 of the chassis 12 is likewise of plate-like construction generally forwardly of the axles of the rear wheels 16 while rearwardly thereof the bottom is open, as at 38 (FIG. 2), for engine ventilation and exhaust and terminates in an upwardly inclined portion 40. The engine 20 has the usual shroud 42 about a rearwardly facing cooling fan (not shown) which draws air through an oil cooler 44 mounted in the rear wall 32.

Mounted on the chassis floor 26 immediately to the rear of the recess 34 is a forwardly-facing operator's seat 46 located so that an operator's feet will be positioned in the recess, as shown in FIGS. 1 and 2. Two hand lever steering controls 48 extend upwardly on each side of and adjacent the front of the operator's seat 46. The lower ends of these levers 48 are appropriately connected to the valving 24 for selectively individually controlling the direction and speed of rotation of and for selectively braking each pair of wheels 14 and 16 on opposite sides of the vehicle 10.

The exposed portions of the chassis 12 are armored. The front wall 30, below the floor of the recess 34, the bottom wall 36 and the side walls 28 of the chassis may, where available and appropriate, be reenforced with back-up armor 50, such as quarter-inch low carbon steel plate although it is contemplated equivalent armor material, e.g. reenforced plastic, could be used instead. The bottom opening 38 in the chassis 12 is covered by armored louvers 52 which obstruct line of sight through the opening 38. The louver construction preferably is formed by transverse angle bars of sufficient strength to be both bulletproof and grenade resistant.

Mounted on the chassis 12 is a body 54 that is laterally widened so as to extend somewhat outwardly over the wheels 14 and 16, and also rearwardly elongated so as to extend somewhat rearwardly of the chassis 12, as shown best in FIG. 2. The body 54 has side, front, rear and top walls 56, 58, 60, and 62, respectively, made of steel armor plate of the order of 9/16 inch thick, although again it is contemplated that other types of armor material could be used. Preferably the front and rear walls 58 and 60 of the body 54 converge upwardly, as shown in FIGS. 1 and 2, for weight saving and bullet-deflecting purposes. Almost the entire front wall 58 of the body 54 is formed by an operator's door 64 that is hinged to one side wall 56 of the body 54 and adapted to be locked in closed position from the inside. The door 64 has a lower central narrowed portion 66 which, at its lower end, depends below the chassis floor 26 and covers the front of the recess 34. The rear body wall 60 also has at its lower end a central narrowed portion 67 which depends below the floor 26 of the chassis 12. Side wall portions 68 (FIG. 2) extend forwardly from the side edges of the narrowed portion 67 to form, with the rear chassis wall 32, an armored air intake compartment 70 having an open bottom provided with armored louvers 72 similar to the louvers 52.

The door 64 and side and rear walls 56 and 60 of the body 54 are provided with transparent bulletproof windows 74, 76 and 78, respectively, made, for example, of 1.3 inch General Electric Lexgard, while the door and the side walls of the body are provided with gun ports 79 for use of a pistol or rifle by the operator. The top 62 of the body 54 has side flanges 80 which depend in spaced overlapping relation with the upper marginal portions of the side walls 56. The upper edges of these side walls 56 are cut away at intervals therealong, as shown at 82 in FIG. 2, while the edges of the flanges 80 are secured at spaced intervals therealong to the side walls by welded bar sections 84 so as to provide openings for passage of fresh air into the body 54.

The interior of the body 54 is divided, by an airtight fire wall 86, into a forward operator's compartment 88 and a rear engine accessory compartment 90 located beneath the rear window 78. The lower end of the firewall 86 desirably is extended forwardly beneath the seat, as at 92, and thence downwardly forward of the valving 24, as at 94, to the bottom wall 36 of the chassis 12. Located within the accessory compartment 90 may be a tank 96 for hydraulic fluid for the pump 22 and a bullet-resistant fuel cell 98 for the engine 20. Desirably the tank 96 is separated from the remainder of the compartment 90 by another firewall 100. Preferably the filler pipe (not shown) for the fuel cell 98 and the filler and breather pipe 102 for the tank 96 terminate within a small closed compartment 104 adjacent the left body wall 56. Access to this compartment 104 may be provided by a door (not shown) in the left body wall 56. An air cleaner 106 may be located in the air intake compartment 70 and connected to the engine carburetor (not shown) by a duct 108 of rigid rubber. The exhaust manifold (not shown) of the engine is connected to a muffler 110 which may be located in the accessory compartment 90 and has a tail pipe 112 leading down into the chassis 12 alongside the engine 20 and terminating adjacent the lower ventilation opening 38.

The vehicle 10 preferably is provided with pairs of head lamps contained within appropriately ventilated armored housings 114 recessed into the body 54, both at the front and at the rear of the vehicle. Appropriate signal lights, such as a blue flashing light 116 and a red flashing light 118, may be mounted on top of the vehicle 10. Also the vehicle includes a public address system including a loudspeaker 120 on top for addressing offensive individuals. Other desirable equipment includes a two-way radio, shown diagrammatically at 122, located in the operator's compartment 88 along with the usual gauges and engine controls (not shown). Desirably, the vehicle 10 also is provided, on its top 62, with a remote-controlled spotlight 124 mounted in a suitable protective wire cage 126.

The wheels 14 and 16 have tires of solid rubber or of rubber filled with a hardenable plastic foam so that they are bullet resistant.

Desirably, the overall maximum width of the vehicle 10, which is at the wheels 14 and 16, is less than four feet, while the overall length is not more than about seven and one-half feet and overall height not more than about six and one-half feet. Because of its small size and wheel drive controls it will be seen that the vehicle 10 is extremely maneuverable and can enter into many types of buildings and maneuver therein without great difficulty. Further, the vehicle 10 can be stored in a conventional building or other protected area so that an operator can readily enter and leave the same without being subjected to sniper fire.

It thus will be seen that the objects of this invention have been fully and effectively accomplished. It will be realized, however, that the foregoing specific embodiments have been shown and described only for the purpose of illustrating the principles of the invention and are subject to extensive change and modification without departure from such principles. Therefore, this invention includes all modifications encompassed within the spirit and scope of the following claims.

I claim:
1. A one-man armored vehicle comprising:
a self-propelled chassis having at least a pair of front and a pair of rear wheels provided with rubber-like bullet-resistant tires, an internal combustion engine for driving said wheels, transmission means between said engine and said wheels, and manually-operable means for selectively controlling the transmission and reversing of power from said engine to said wheels on the opposite sides of said vehicle;

an operator's seat on and adjacent the front portion of said chassis, said manually-operable means including a pair of hand levers one on each side of said seat;

armored housing means substantially enclosing said chassis, except for said wheels, and extending thereabove to define in part an operator's compartment, said housing means including an armored front access door provided with a transparent bullet-resistant window and a gun port therebelow, side and rear transparent bullet-resistant windows, and side gun ports below said side windows, said windows substantially providing 360° visibility for an operator and said gun ports being only large enough to accommodate the muzzle of a firearm to minimize the possibility of bullets entering said compartment;

means defining an opening in the lower rear portion of said housing means for ingress of air to and egress of air and exhaust from said engine; and armored louver means covering said opening and substantially obstructing line of sight therethrough.

2. The structure defined in claim 1 in which the louver means comprises transverse angle bars.

3. The structure defined in claim 1 in which the chassis includes means defining a top recess between the front wheels for accommodating the feet of an operator and the door covers the front of said recess.

4. The structure defined in claim 1 including tanks for hydraulic fluid and engine fuel within the housing means above the chassis and to the rear of the operator's seat and including a firewall separating said tanks from said seat.

5. The structure defined in claim 1 in which the housing means has above the chassis a rearwardly inclined front wall defined, in part, by the door.

6. The structure defined in claim 1 including an airtight firewall within the housing means separating the operator's compartment from the engine transmission means, and controlling means.

7. The structure defined in claim 1 including means within the housing means defining an air intake compartment directly communicating with a portion of the opening and an engine ventilation and exhaust compartment directly communicating with another portion of said opening.

8. The structure defined in claim 1 in which the vehicle is of the order of not more than 4 feet wide, 6 feet long, and 6½ feet high in overall dimensions.

9. The structure defined in claim 1 in which the transmission means includes a plurality of hydraulic motors, one for and drivingly connected to each of said wheels, and a pump driven by the engine for supplying hydraulic motive fluid to said motors, and the manually-operable means includes valving between said pump and each of said motors.

* * * * *